United States Patent
Miller et al.

(10) Patent No.: US 7,310,910 B2
(45) Date of Patent: Dec. 25, 2007

(54) FLORAL ARRANGEMENT HOLDING ASSEMBLY AND METHOD

(76) Inventors: Terry Miller, 97 Greenwood Ave., Trappe, PA (US) 19426; Marlin S. Miller, 97 Greenwood Ave., Trappe, PA (US) 19426

( * ) Notice: Subject to any disclaimer, the term of this patent is extended or adjusted under 35 U.S.C. 154(b) by 0 days.

(21) Appl. No.: 10/621,423

(22) Filed: Jul. 18, 2003

(65) Prior Publication Data

US 2005/0011116 A1 Jan. 20, 2005

(51) Int. Cl.
*A47G 7/00* (2006.01)
*A01G 5/00* (2006.01)

(52) U.S. Cl. ............... 47/41.12; 47/41.01; 248/27.8; 428/19; 428/17

(58) Field of Classification Search .......... 47/66.7, 47/66.1, 41.12, 41.1, 84, 41.11, 47.13, 41.14, 47/41.15, 41.01, 41.13; 27/30; 206/423; 248/27.8; A01G 5/00; A47G 7/02, 7/00
See application file for complete search history.

(56) References Cited

U.S. PATENT DOCUMENTS

| | | | | |
|---|---|---|---|---|
| 336,697 | A * | 2/1886 | Davis | 83/835 |
| 2,482,278 | A * | 9/1949 | Koerner | 248/156 |
| 2,765,585 | A * | 10/1956 | Smithers | 47/41.12 |
| 2,891,354 | A * | 6/1959 | Smithers | 47/41.12 |
| 3,183,624 | A * | 5/1965 | Swett | 47/41.11 |
| 3,651,601 | A * | 3/1972 | La Montagne | 47/41.12 |
| 3,962,825 | A * | 6/1976 | O'Connell | 47/41.12 |
| 4,204,365 | A * | 5/1980 | Hirvi | 47/41.01 |
| 4,566,221 | A * | 1/1986 | Kossin | 47/41.12 |
| 4,887,385 | A * | 12/1989 | James et al. | 47/41.12 |
| 5,070,644 | A * | 12/1991 | Hasty | 47/41.12 |
| 5,414,957 | A * | 5/1995 | Kenney | 47/41.12 |
| 5,450,691 | A * | 9/1995 | Christie et al. | 47/83 |

(Continued)

FOREIGN PATENT DOCUMENTS

FR 2620591 A1 * 3/1989
GB 1544630 * 4/1979

OTHER PUBLICATIONS

English translation, French Patent 2620591, Support for Flowers or Other Decorative Objects that can be Inserted in the Same, Publication Date Mar. 1989, Name Manfred Roder, Classification A01G5/04, 9 pages including title page.*

*Primary Examiner*—Andrea M. Valenti
(74) *Attorney, Agent, or Firm*—LaMorte & Associates

(57) ABSTRACT

A device and method for helping a floral designer create a floral arrangement that is well balanced in its distribution of flowers and greens. The device includes a three-dimensional foam structure that has a plurality of different levels. Each of the different levels is of a different size, thereby creating an overall tapered foam structure. Areas of equal size are demarcated on each of the different levels. The areas of equal size are evenly distributed around a plurality of different levels. The demarcation of the various equal sized areas are created either by using an external grid work that lay over the foam structure or shaping the foam into protrusions on each level. Using the equal sized areas as a distribution grid, a floral designer can quickly and easily place flowers and greens throughout the three-dimensional foam structure in a manner that is evenly distributed and well balanced.

5 Claims, 4 Drawing Sheets

U.S. PATENT DOCUMENTS

| | | | |
|---|---|---|---|
| 5,758,452 A | 6/1998 | Matteucci et al. | 47/41.01 |
| 6,007,882 A * | 12/1999 | Worcester | 428/18 |
| 6,289,631 B1 * | 9/2001 | Harshman et al. | 47/41.12 |
| 6,393,762 B1 * | 5/2002 | Harshman et al. | 47/41.12 |
| 6,688,040 B1 * | 2/2004 | Yang | 47/41.1 |
| 2003/0136049 A1 * | 7/2003 | Ghiotti | 47/41.01 |

* cited by examiner

FLORAL ARRANGEMENT HOLDING ASSEMBLY AND METHOD

BACKGROUND OF THE INVENTION

1. Field of the Invention

In general, the present invention relates to devices and methods that are used to retain floral arrangements on bouquets, table centerpieces and the like. More particularly, the present invention relates to partitioned bases that retain flowers and help a floral designer create a balanced floral arrangement.

2. Description of the Prior Art

Cut flowers and greens have been used as decorations for many centuries. As is well known, most cut flowers and greens remain alive and beautiful for a significant period of time if they are placed in water while being displayed. As such, most all cut flowers are typically displayed in a vase or some other container that is designed to hold both the flowers and a volume of water that surrounds the cut stems of the flowers.

If the cut flowers are to be transported, such as with a bridal bouquet, then the flowers are typically placed in a water permeable synthetic foam. The foam retains water and exposes the water to the cut ends of the flowers without allowing water to flow freely and splash or drip from the bouquet.

Over the years, the art of floral design has developed into a sophisticated art form. In floral design, flowers and greens are placed in arrangements according to their color, size, flower type and shape. However, in order to create an aesthetically pleasing arrangement, flowers and greens must be set into a designed arrangement so that both the flowers and greens remain erect, oriented and properly spaced. Flowers and greens are not just randomly combined and displayed. Rather, great care is taken to place each flower and each green into a particular position that enhances the beauty of the overall display.

To help a floral designer maintain a sense of balance in a floral design, there have been developed many types of grids. Grids are structures that are placed over vase openings or over a block of synthetic foam that contains a plurality of evenly spaced openings. By placing a flower or two into each opening in a grid, a floral designer can be assured that the flowers in the display are evenly distributed. Prior art grid structures for floral designs are exemplified by U.S. Pat. No. 5,758,452 to Matteucci, entitled Floral Arranging Aid.

A problem with prior art grid structures for floral arrangements is that they are only two-dimensional. The grid covers the open end of a vase or similar structure. However, in many floral arrangements, flowers are arranged on a three-dimensional foam base. Often sections of synthetic foam are cut into complex three-dimensional shapes and are used to support flowers at various positions and heights. Since prior art grid structures cannot be used on such three-dimensional floral arrangement bases, a floral designer must be careful to evenly arrange the flowers in the display. This adds significantly to the amount of time it takes a floral designer to create a professional appearing design.

A need therefore exists in the art for a floral arrangement grid structure that is three-dimensional, thereby enabling a person to quickly create floral arrangements on three-dimensional bases. This need is met by the present invention as described and claimed below.

SUMMARY OF THE INVENTION

The present invention is a device and method for helping a floral designer create a floral arrangement that is well balanced in its distribution of flowers and greens. The device includes a three-dimensional foam structure that has a plurality of different levels. Each of the different levels is of a different size, thereby creating an overall tapered foam structure.

Areas of equal size are demarcated on each of the different levels. The areas of equal size are evenly distributed around a plurality of different levels. The demarcation of the various equal sized areas are created either by using an external grid work that lay over the foam structure or shaping the foam into protrusions on each level. Once the foam structure is demarcated into equal areas, a floral designer can insert flowers and greens into the foam structure. Using the equal sized areas as a distribution grid, a floral designer can quickly and easily place flowers and greens throughout the three-dimensional foam structure in a manner that is evenly distributed and well balanced. Accordingly, the time required to create a three-dimensional floral display is greatly reduced.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention device and method can be used to create any three dimensional floral display, such as a table centerpiece or the like, the present invention is particularly well suited for retaining cut flowers in a hand-held bouquet. Accordingly, the present invention is described in an application where it is used to hold flowers in a bouquet in order to set forth the best mode contemplated for the invention.

Figure 1:
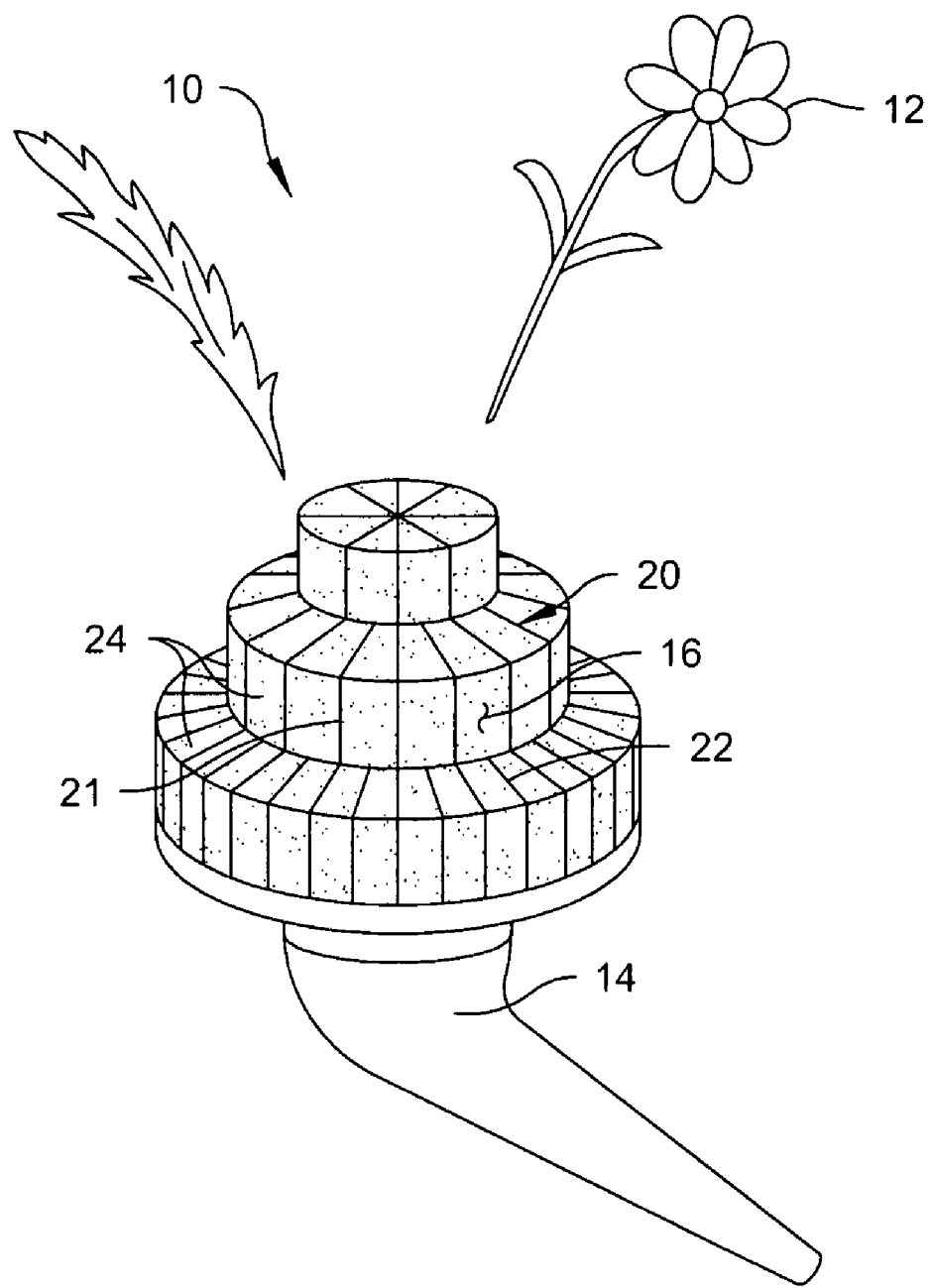
FIG. 1 is a perspective view of an exemplary embodiment of the present invention assembly shown in conjunction with elements of a floral arrangement.

Referring to FIG. 1, an embodiment of the present invention floral display assembly 10 is shown in conjunction with a plurality of cut flowers and greens 12. The display assembly 10 has a bouquet handle 14. The bouquet handle 14 supports a three-dimensional foam structure 16. In the shown embodiment, the three-dimensional foam structure 16 consists of a plurality of stacked disks of foam, that vary in diameter on each level. This creates a stepped "wedding cake" shaped foam structure.

A grid work 20 is disposed over the foam structure 16. The grid work 20 conforms to the exterior shape of the foam structure 16. The grid work 20 is comprised of a plurality of interconnected vertical elements 21 and horizontal elements 22. The various vertical elements 21 and horizontal elements 22 lay over the different vertical surfaces and horizontal surfaces of the foam structure 16. This divides the foam structure 16 into a plurality of equally spaced grid squares 24 on all surfaces.

Since the grid work 20 divides the three-dimensional foam structure 16 into squares, a floral designer can insert flowers and greens 12 into the foam structure 16 within each of the grid work squares 24. By placing an equal number of flowers and/or greens 12 in each of the grid work squares 24, the floral designer can be ensured that the flowers and greens 12 are evenly distributed around the entire bouquet.

Figure 2:
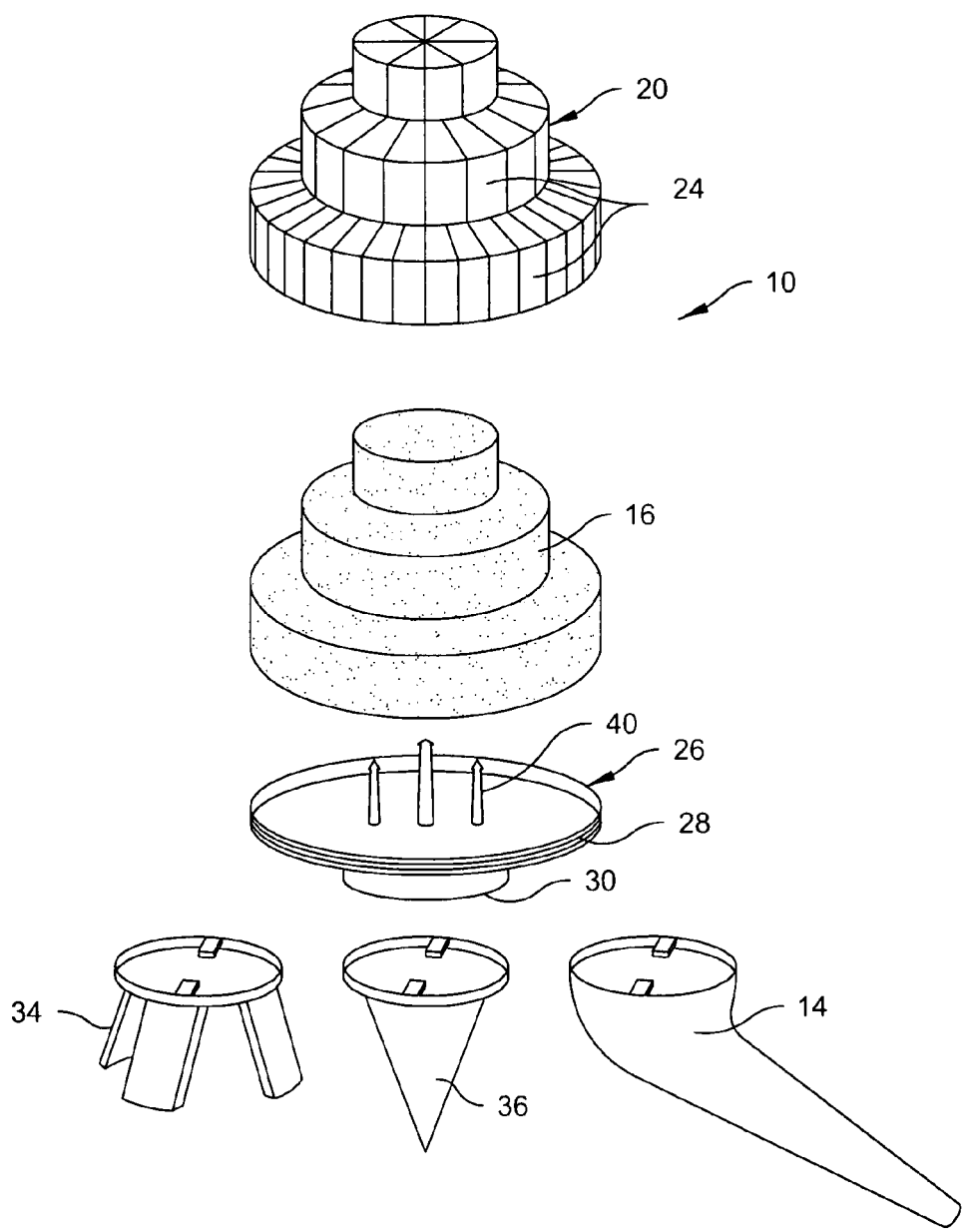
FIG. 2 is an exploded view of the embodiment of the present invention assembly shown in FIG. 1, further including a selection of possible support structures that can be used as part of the assembly.

Referring to FIG. 2, it can be seen that the foam structure 16 lay in a small plastic tray 26. The tray has a side wall 28 that enables the tray 26 to hold a small volume of water without dripping. In this manner, if ever the foam structure 16 is over saturated with water, the tray 26 can retain the excess water and prevent the arrangement from dripping.

The tray 26 has a connector mechanism 30 on its bottom surface. The connector mechanism 30 enables the tray 26 to be selectively attached to a variety of different types of supports 32. One of the supports 32 that can be used is a bouquet handle 14, such as that previously shown in FIG. 1. Other types of supports 32 include, a free standing support 34, that enables the floral arrangement to stand as a table centerpiece. Supports, such as spike supports 36, can be used that enable the floral arrangement to be inserted into a filled pot or other such display structure. In any case, the support 32 for the tray 26 can be selectively varied depending upon the selected application of the floral display as a bouquet, centerpiece, pot decoration or the like.

There are many different types of connector mechanisms 30 that can be used to interconnect the bottom of the tray 26 to the various supports. Connector mechanisms that require a simple manual manipulation of the tray 26 relative the support 32 to open and close are preferred over connections that utilize screws and require tools. Any known connector mechanism can be adapted for use as part of the present invention.

A plurality of prongs 40 extend upwardly from the inside of the tray 26. The three-dimensional foam structure 16 can be pressed down onto the prongs 40, where the prongs 40 help retain the foam structure 16 in place.

The three-dimensional foam structure 16 can be a single piece of molded foam or can be separate pieces of foam that are stacked atop one another. If separate pieces of foam are used, the prongs 40 extending upwardly from the tray 26 help retain the various layers of foam together in the proper stacked configuration.

The grid work 20 is preferably a molded plastic structure that passes over the three-dimensional foam structure 16 and engages the tray 26. The grid work 20 is configured to fit over the three-dimensional foam structure 16, wherein the grid work 20 conforms to the various contours of the foam structure 16. The grid work 20 serves two purposes. First, the grid work 20 demarcates the surfaces of the three-dimensional foam structure 16 into equally spaced squares 24. The grid work squares 24 are present both on the vertical surfaces and the horizontal surfaces of the three-dimensional foam structure 26. Accordingly, flowers and greens can be evenly distributed both laterally and vertically in the three-dimensional foam structure 16 by placing even numbers of flowers and greens into the foam through each of the grid work squares 24.

The second purpose of the grid work 20 is to retain the foam structure 16 in place. The three-dimensional foam structure 16, when saturated with water and pierced with flowers, can become quite heavy. The grid work 20 mechanically engages the tray 26, thereby enveloping the three-dimensional foam structure 16 and ensuring that the three-dimensional foam structure 16 does not separate from the tray 26.

Figure 3:
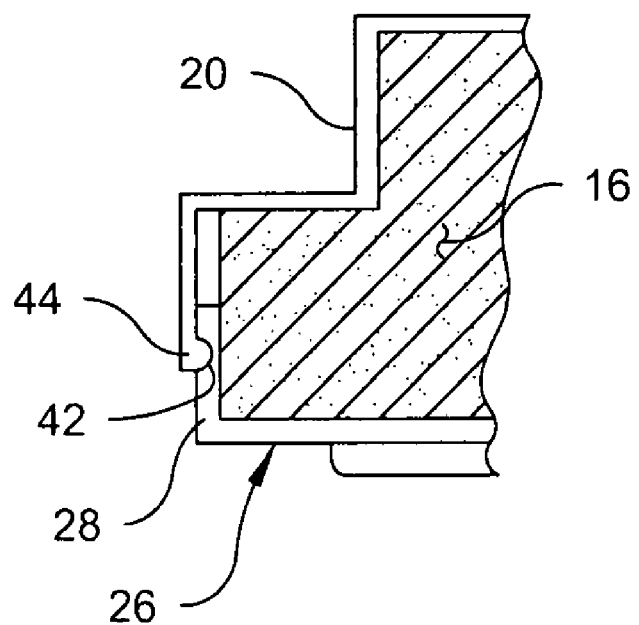
FIG. 3 is a fragmented cross-sectional view of the grid work engaging the tray within the assembly of the present invention.

Referring briefly to FIG. 3, it can be seen that a groove 42 is formed on the exterior of the wall 28 of the tray 26. A protrusion 44 is formed on the interior of the grid work 20 that passes into the groove 42. As such, the grid work 20 snaps into place around the tray 26. The use of such an interconnection is merely exemplary and it should be understood that the grid work 20 can engage the tray 26 using threaded connections, frictional fit connections or snap engagement connections.

Returning to FIG. 2, it will be understood that to utilize the present invention floral arrangement assembly 10, the grid work 20 is separated from the tray 26 and a new three-dimensional foam structure 16 is placed on the tray 26. The grid work 20 is then placed over the three-dimensional foam structure 16 and locked to the tray 26. The three-dimensional foam structure 16 is then saturated with water. Once wet, a floral designer can insert various flowers and greens into the three-dimensional foam structure 16, using the grid work squares 24 to help space the floral arrangement.

A proper support attachment 32 can then be added to the bottom of the tray 26 depending upon whether the floral arrangement will be used as a bouquet, a centerpiece or for some other purpose.

Once the floral arrangement has served its purpose, the flowers and greens can be pulled from the three-dimensional foam structure 16 and discarded. The grid work 20 can then be separated from the tray 26 and the used foam structure 16 can be discarded. A new three-dimensional foam structure 16 can be placed onto the tray 26 and the floral arrangement assembly 10 can be used again to support a different floral arrangement.

Figure 4:
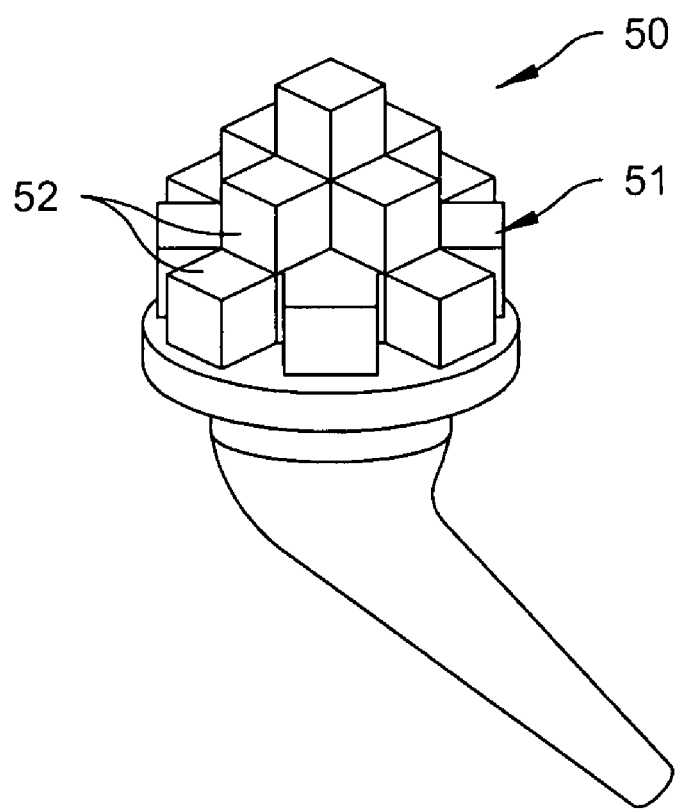
FIG. 4 is a perspective view of an alternate embodiment of the present invention floral arrangement assembly.

In the embodiments of FIG. 1 and FIG. 2, the three-dimensional foam structure 16 has a wedding cake shape consisting of stacked disk-shaped sections. Such a configuration is simple but provides only a limited number of surfaces in which flowers and greens can be inserted. More complex floral arrangements can be made using more complex three-dimensional foam structures. Referring to FIG. 4, one such complex embodiment is shown. In the embodiment of FIG. 4, a three-dimensional foam structure 50 is shown, wherein each layer 51 is configured like a cog. As such, each layer 51 in the three-dimensional foam structure 50 has a plurality of square cog teeth protrusions 52 that symmetrically protrude from a central hub. As such, flat surfaces are exposed at the top and sides of each of the cog teeth protrusions 52, wherein each of these exposed surfaces lay in a different plane. The various cog teeth protrusions 52 on each level of the three-dimensional foam structure 50 are staggered. As such, the cog teeth protrusions 52 on adjoining layers of the three-dimensional foam structure do not align in common planes. Accordingly, differently oriented planes are present on each level of the three-dimensional foam structure 50. This enables a floral designer to place flowers and greens at a variety of different angles on each level 51 of the three-dimensional foam structure 50.

In the embodiment of FIG. 4, each level 51 of the three-dimensional foam structure 50 is physically shaped into a variety of square cog projections 52. The square cog projections 52 demarcate the foam structure 50 into a plurality of evenly spaced square surfaces. Accordingly, a grid work is not necessary to help a floral designer evenly space flowers and greens. Rather, a floral designer need only place the same number of flowers or greens into each surface of each square cog projection 52 in order to ensure that the flowers and greens are evenly distributed throughout the three-dimensional foam structure 50.

In the embodiment of FIGS. 1 and 2, large areas of foam material are provided that are demarcated into smaller squares using an external grid work. In the embodiment of FIG. 4, the foam material itself is formed into a variety of square surfaces. In both embodiments, the various square surfaces are used to position various flowers and greens into the three-dimensional foam structure. By placing the same number of flowers and/or greens into each square surface, a floral arrangement can quickly be made where the flowers and greens are uniformly distributed.

It will be understood that the embodiments of the present invention device and method described and illustrated herein are merely exemplary and a person skilled in the art can make many variations to the embodiments shown without departing from the scope of the present invention. All such variations, modifications and alternate embodiments are intended to be included within the scope of the present invention as defined by the appended claims.

What is claimed is:

1. A floral arrangement assembly, comprising:
   a plurality of foam elements that include a base level element and at least one subsequent level element, wherein each of said plurality of foam elements are generally cog shaped having square cog projections that symmetrically protrude in a radial pattern, and wherein said base level element and said at least one subsequent level element differ in size and are stacked atop each other forming a foam structure having tiered configuration with multiple levels and exposed vertical surfaces and horizontal surfaces on each of said levels;
   a tray for supporting said foam structure, said tray having a top surface, upon which said foam structure rests, and an opposite bottom surface; and
   a continuous wall extending upwardly from said top surface of said tray, wherein continuous wall and said top surface of said tray define an area capable or retaining a predetermined volume of water.

2. The assembly according to claim 1, further including at least one prong on said top surface of said tray that extends up into said foam structure, thereby retaining said plurality of foam elements in a set position on said tray.

3. The assembly according to claim 1, further including a support that extends from said bottom surface of said tray for supporting said tray.

4. The assembly according to claim 3, wherein said tray is selectively attachable and removable from said support.

5. The assembly according to claim 4, wherein said support is selected from a group consisting of bouquet handles, centerpiece stands and ground spikes.

* * * * *